(12) United States Patent
Salter et al.

(10) Patent No.: US 12,010,175 B2
(45) Date of Patent: Jun. 11, 2024

(54) VEHICLE OPERATION FOR PROVIDING ATTRIBUTE DATA

(71) Applicant: Ford Global Technologies, LLC, Dearborn, MI (US)

(72) Inventors: Stuart C. Salter, White Lake, MI (US); Pietro Buttolo, Dearborn Heights, MI (US); Kristin A. Hellman, Walled Lake, MI (US); William H. Wurz, San Francisco, CA (US); David Kennedy, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/577,567

(22) Filed: Jan. 18, 2022

(65) Prior Publication Data
US 2023/0231916 A1  Jul. 20, 2023

(51) Int. Cl.
*H04L 67/12*   (2022.01)
*B60R 16/03*   (2006.01)

(52) U.S. Cl.
CPC .......... *H04L 67/12* (2013.01); *B60R 16/0315* (2013.01)

(58) Field of Classification Search
CPC .......... H04L 67/12; H04W 4/46; H04W 4/48; H04W 76/40; H04W 4/38; H04W 8/005; G05D 1/0027; G08G 1/22; G08G 1/096725; G08G 1/0965; G08G 1/096708; H04H 60/25
See application file for complete search history.

(56) References Cited

U.S. PATENT DOCUMENTS

| | | | |
|---|---|---|---|
| 7,450,603 B2 | 11/2008 | Nix et al. | |
| 7,501,934 B2 | 3/2009 | Tischer | |
| 9,867,022 B1* | 1/2018 | Schaefer, Jr. | G01C 21/3461 |
| 9,970,615 B1* | 5/2018 | Cardillo | H05B 33/02 |
| 11,242,051 B1* | 2/2022 | Konrardy | G08G 1/096791 |
| 11,425,530 B2* | 8/2022 | Hayes | G06Q 50/30 |
| 11,579,631 B1* | 2/2023 | Ebrahimi Afrouzi | B60W 30/165 |
| 2011/0022248 A1* | 1/2011 | McQuade | G06Q 10/06 701/2 |
| 2012/0283925 A1* | 11/2012 | Barlsen | B60T 17/22 701/70 |
| 2014/0094210 A1* | 4/2014 | Gellens | H04W 4/12 455/517 |
| 2018/0137697 A1* | 5/2018 | Dudar | G07C 5/0808 |
| 2019/0069052 A1* | 2/2019 | Al-Stouhi | H04W 4/46 |
| 2019/0244519 A1* | 8/2019 | Cha | G08G 1/042 |
| 2019/0250632 A1* | 8/2019 | Agarwal | G05D 1/0274 |
| 2020/0114920 A1* | 4/2020 | Zhang | G08G 1/096708 |

(Continued)

FOREIGN PATENT DOCUMENTS

CN   110085022 A   8/2019

*Primary Examiner* — Tonia L Dollinger
*Assistant Examiner* — Linh T. Nguyen
(74) *Attorney, Agent, or Firm* — Christopher Storms; Bejin Bieneman PLC

(57) ABSTRACT

A first message is broadcasted to a plurality of remote computers identifying an attribute of a host vehicle. A second message including a request to receive data about the identified attribute in response to broadcasting the first message is received from one of the remote computers. Upon receiving the second message, a host vehicle component is actuated to output at least one of light or sound associated with the identified attribute.

18 Claims, 4 Drawing Sheets

(56) References Cited

U.S. PATENT DOCUMENTS

| | | | |
|---|---|---|---|
| 2021/0078629 A1* | 3/2021 | Boss | B62D 6/007 |
| 2021/0201683 A1* | 7/2021 | van den Berg | B64C 39/024 |
| 2021/0312806 A1* | 10/2021 | Kulakov | G08G 1/096741 |
| 2022/0030430 A1* | 1/2022 | Lund | H04W 8/24 |
| 2023/0231916 A1* | 7/2023 | Salter | B60R 16/0315 |
| | | | 709/206 |

* cited by examiner

VEHICLE OPERATION FOR PROVIDING ATTRIBUTE DATA

BACKGROUND

A vehicle can be equipped with electronic and electro-mechanical components, e.g., computing devices, networks, sensors, controllers, etc. Vehicle sensors can provide data about objects in an environment around the vehicle. Additionally, remote computers can communicate with the vehicle, e.g., via a packet network, vehicle-to-vehicle (V2V) communication, etc., to provide the vehicle with such data. A vehicle computing device can operate a vehicle and make real-time decisions based on data received from sensors and/or the remote computers.

DETAILED DESCRIPTION

Figure 1:
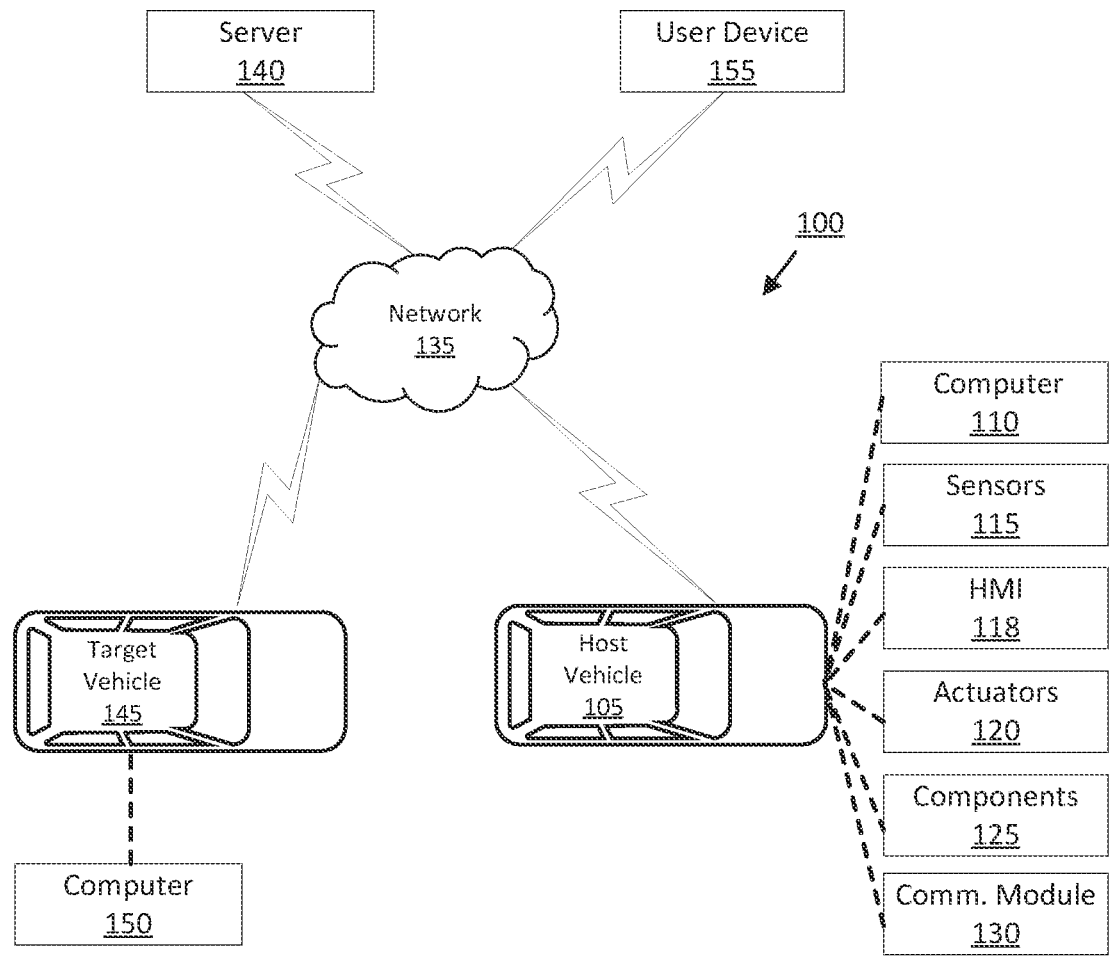
FIG. 1 is a block diagram illustrating an example control system for a host vehicle.

A vehicle computer can communicate with a remote computer to share data about a vehicle. For example, the vehicle computer can actuate a vehicle component to provide the data to the remote computer. It is possible that the vehicle computer may provide data that the remote computer does not request. That is, the vehicle computer may actuate vehicle components to provide unrequested data. Determining requested data and actuating vehicle components as described herein to provide only the requested data can more efficiently manage actuation of vehicle components for providing the data to the remote computer, e.g., by preventing actuation of vehicle components that provide unrequested data.

Data about an attribute (as discussed below) of a vehicle may be requested by a remote computer whereby vehicle components may draw power from a battery to output a light and/or sound associated with the identified attribute. Actuating vehicle components to output the light and/or sound can increase power consumed from a battery. Managing, including possibly limiting, power consumption, as described herein, is beneficial for a vehicle that relies on a finite supply of stored power.

Advantageously, as disclosed herein, a vehicle computer can provide an energy-efficient way to provide data about an attribute of the vehicle to a remote computer. The vehicle computer can broadcast a first message identifying the attribute of the vehicle. In response to receiving a second message from a remote computer requesting additional data about the attribute, the vehicle computer can actuate the vehicle component(s) to output the light and/or sound associated with the attribute. Selectively actuating the vehicle components to output light and/or sound associated with attributes when requested by a remote computer can prevent or reduce power consumed from the battery, e.g., as compared to continuously or periodically actuating the vehicle components to output light and/or sound associated with attributes.

A system includes a computer including a processor and a memory, the memory storing instructions executable by the processor to broadcast a first message to a plurality of remote computers identifying an attribute of a host vehicle. The instructions further include instructions to receive, from one of the remote computers, a second message including a request to receive data about the identified attribute in response to broadcasting the first message. The instructions further include instructions to, upon receiving the second message, actuate a host vehicle component to output at least one of light or sound associated with the identified attribute.

The instructions can further include instructions to, upon actuating the host vehicle component, receive, from the one remote computer, a third message confirming receipt of the requested data.

The system can include the one remote computer. The one remote computer can be included in a target vehicle. The one remote computer can include a second processor and a second memory storing instructions executable by the second processor such that the one remote computer is programmed to actuate a target vehicle component based on detecting actuation of the host vehicle component. The target vehicle component can be at least one of a speaker or a display. The one remote computer can be further programmed to actuate a target vehicle sensor to obtain sensor data including the host vehicle upon providing the second message.

The host vehicle component can be at least one of a lighting component, a speaker or a display The instructions can further include instructions to select the attribute of the host vehicle based on a user input.

The instructions can further include instructions to determine broadcast parameters based on a user input.

The instructions can further include instructions to initiate broadcasting of the first message based on a user input.

The system can include the one remote computer. The one remote computer can include a second processor and a second memory storing instructions executable by the second processor such that the one remote computer is programmed to identify the attribute of the host vehicle based on receiving the first message. The one remote computer can be further programmed to provide the second message based on determining that the identified attribute corresponds to a requested attribute. The one remote computer can be further programmed to ignore the first message based on determining that the identified attribute does not correspond to the requested attribute. The one remote computer can be further programmed to determine the requested attribute based on a user input.

The attribute can include at least one of a vehicle type, operation data, or occupant data.

A method includes broadcasting a first message to a plurality of remote computers identifying an attribute of a host vehicle. The method further includes receiving, from one of the remote computers, a second message including a request to receive data about the identified attribute in response to broadcasting the first message. The method further includes, upon receiving the second message, actuating a host vehicle component to output at least one of light or sound associated with the identified attribute.

The method can further include determining the attribute of the host vehicle to broadcast based on a user input.

The method can further include determining broadcast parameters based on a user input.

The method can further include initiating broadcasting of the first message based on a user input.

The attribute can include at least one of a vehicle type, operation data, or occupant data.

The host vehicle component can be at least one of a lighting component, a speaker or a display.

Further disclosed herein is a computing device programmed to execute any of the above method steps. Yet further disclosed herein is a computer program product, including a computer readable medium storing instructions executable by a computer processor, to execute an of the above method steps.

Figure 2A:
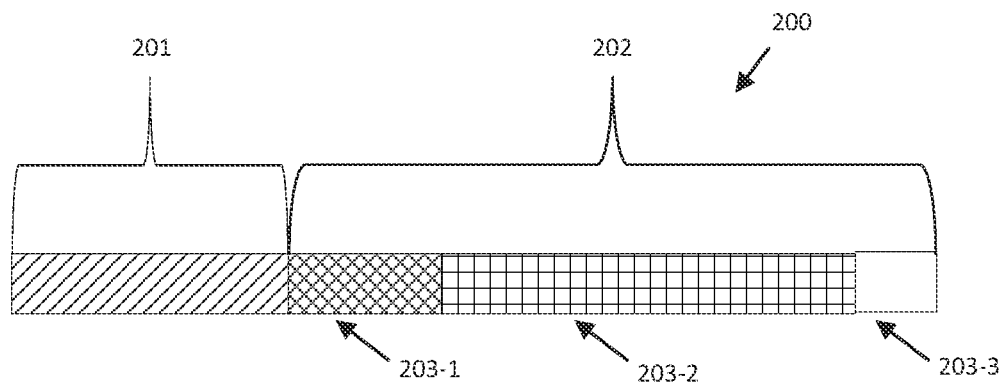
FIG. 2A is a block diagram illustrating an example first message.
Figure 2B:
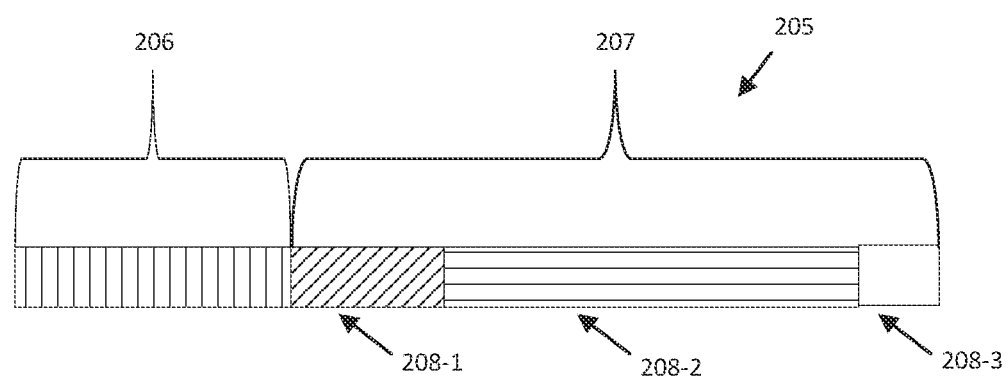
FIG. 2B is a block diagram illustrating an example second message.
Figure 2C:
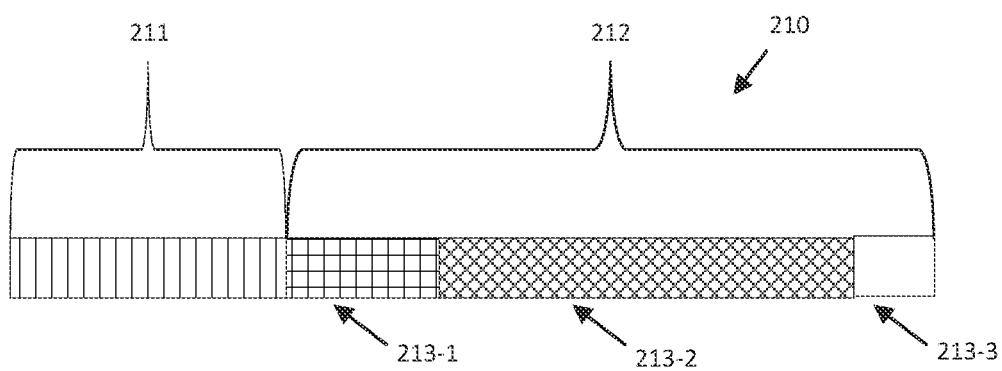
FIG. 2C is a block diagram illustrating an example third message.

With reference to FIGS. 1-2C, an example vehicle control system 100 includes a host vehicle 105. A vehicle computer 110 in the host vehicle 105 receives data from sensors 115. The vehicle computer 110 is programmed to broadcast a first message 200 to a plurality of remote computers 150, 155 identifying an attribute of the host vehicle 105. The vehicle computer 110 is programmed to receive, from at least one of the remote computers 150, 155, a second message 205 including a request to receive data about the identified attribute in response to broadcasting the first message 200. The vehicle computer 110 is programmed to, upon receiving the second message 205, actuate a host vehicle component 125 to output at least one of light or sound associated with the identified attribute.

Turning now to FIG. 1, the host vehicle 105 includes the vehicle computer 110, sensors 115, actuators 120 to actuate various vehicle components 125, and a vehicle communications module 130. The communications module 130 allows the vehicle computer 110 to communicate with a remote server computer 140, a user device 155, and/or other vehicles, e.g., via a messaging or broadcast protocol such as Dedicated Short Range Communications (DSRC), cellular, IEEE 802.11, Bluetooth®, Ultra-Wideband (UWB), and/or other protocol that can support vehicle-to-vehicle, vehicle-to-infrastructure, vehicle-to-cloud communications, or the like, and/or via a packet network 135.

The vehicle computer 110 includes a processor and a memory such as are known. The memory includes one or more forms of computer-readable media, and stores instructions executable by the vehicle computer 110 for performing various operations, including as disclosed herein. The vehicle computer 110 can further include two or more computing devices operating in concert to carry out vehicle 105 operations including as described herein. Further, the vehicle computer 110 can be a generic computer with a processor and memory as described above, and/or may include an electronic control unit (ECU) or electronic controller or the like for a specific function or set of functions, and/or may include a dedicated electronic circuit including an ASIC that is manufactured for a particular operation, e.g., an ASIC for processing sensor data and/or communicating the sensor data. In another example, the vehicle computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the vehicle computer 110.

The vehicle computer 110 may operate and/or monitor the host vehicle 105 in an autonomous mode, a semi-autonomous mode, or a non-autonomous (or manual) mode, i.e., can control and/or monitor operation of the host vehicle 105, including controlling and/or monitoring components 125. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicle 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the host vehicle 105 by controlling one or more of an internal combustion engine, electric motor, hybrid engine, etc.), steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to, e.g., via a vehicle communications network such as a communications bus as described further below, more than one processor, e.g., included in electronic controller units (ECUs) or the like included in the host vehicle 105 for monitoring and/or controlling various vehicle components 125, e.g., a transmission controller, a brake controller, a steering controller, etc. The vehicle computer 110 is generally arranged for communications on a vehicle communication network that can include a bus in the host vehicle 105 such as a controller area network (CAN) or the like, and/or other wired and/or wireless mechanisms.

Via the host vehicle 105 network, the vehicle computer 110 may transmit messages to various devices in the host vehicle 105 and/or receive messages (e.g., CAN messages) from the various devices, e.g., sensors 115, an actuator 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the host vehicle 105, behind a host vehicle 105 front windshield, around the host vehicle 105, etc., that provide relative locations, sizes, and shapes of objects surrounding the host vehicle 105. As another example, one or more radar sensors 115 fixed to vehicle 105 bumpers may provide data to provide locations of the objects, target vehicles 145, etc., relative to the location of the host vehicle 105. The sensors 115 may further alternatively or additionally, for example, include camera sensor(s) 115, e.g., front view, side view, etc., providing images from an area surrounding the host vehicle 105. In the context of this disclosure, an object is a physical, i.e., material, item that has mass and that can be represented by physical phenomena (e.g., light or other electromagnetic waves, or sound, etc.) detectable by sensors 115. Thus, the host vehicle 105, as well as other items including as discussed below, fall within the definition of "object" herein.

The vehicle computer 110 is programmed to receive data from one or more sensors 115 substantially continuously, periodically, and/or when instructed by a remote server computer 140, etc. The data may, for example, include a location of the host vehicle 105. Location data specifies a point or points on a ground surface and may be in a known form, e.g., geo-coordinates such as latitude and longitude coordinates obtained via a navigation system, as is known, that uses the Global Positioning System (GPS). Additionally, or alternatively, the data can include a location of an object, e.g., a vehicle, a sign, a tree, etc., relative to the host vehicle 105. As one example, the data may be image data of the environment around the host vehicle 105. In such an example, the image data may include one or more objects and/or markings, e.g., lane markings, on or along a road. Image data herein means digital image data, e.g., comprising pixels with intensity and color values, that can be acquired by camera sensors 115. The sensors 115 can be mounted to any suitable location in or on the host vehicle 105, e.g., on a host vehicle 105 bumper, on a host vehicle 105 roof, etc., to collect images of the environment around the host vehicle 105.

The host vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of the host vehicle 105.

In the context of the present disclosure, a vehicle component 125 is one or more hardware components adapted to perform a mechanical or electro-mechanical function or operation—such as moving the host vehicle 105, slowing or stopping the host vehicle 105, steering the host vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

The host vehicle 105 further includes a human-machine interface (HMI) 118. The HMI 118 includes user input devices such as knobs, buttons, switches, pedals, levers, touchscreens, and/or microphones, etc. The input devices may include sensors 115 to detect a user input and provide user input data to the vehicle computer 110. That is, the vehicle computer 110 may be programmed to receive user input from the HMI 118. The user may provide the user input via the HMI 118, e.g., by selecting a virtual button on a touchscreen display, by providing voice commands, etc. For example, a touchscreen display included in an HMI 118 may include sensors 115 to detect that a user selected a virtual button on the touchscreen display to, e.g., select or deselect an operation, which input can be received in the vehicle computer 110 and used to determine the selection of the user input.

The HMI 118 typically further includes output devices such as displays (including touchscreen displays), speakers, and/or lights, etc., that output signals or data to the user. The HMI 118 is coupled to the vehicle communication network and can send and/or receive messages to/from the vehicle computer 110 and other vehicle sub-systems.

In addition, the vehicle computer 110 may be configured for communicating via a vehicle-to-vehicle communication module 130 or interface with devices outside of the host vehicle 105, e.g., through a vehicle-to-vehicle (V2V) or vehicle-to-infrastructure (V2X) wireless communications (cellular and/or DSRC., etc.) to another vehicle, and/or to a remote server computer 140 (typically via direct radio frequency communications). The communications module 130 could include one or more mechanisms, such as a transceiver, by which the computers of vehicles may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth®, UWB, IEEE 802.11, dedicated short range communications (DSRC), and/or wide area networks (WAN), including the Internet, providing data communication services.

The network 135 represents one or more mechanisms by which a vehicle computer 110 may communicate with remote computing devices, e.g., the remote server computer 140, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, UWB, vehicle-to-vehicle (V2V) such as Dedicated Short Range Communications (DSRC), etc.), local area networks (LAN) and/or wide area networks (WAN), including the Internet, providing data communication services.

The remote server computer 140 can be a conventional computing device, i.e., including one or more processors and one or more memories, programmed to provide operations such as disclosed herein. Further, the remote server computer 140 can be accessed via the network 135, e.g., the Internet, a cellular network, and/or or some other wide area network.

A target vehicle 145 is a vehicle detected by the host vehicle 105. The target vehicle 145 includes a target vehicle computer 150. The target vehicle computer 150 includes a second processor and a second memory such as are known. The second memory includes one or more forms of computer-readable media, and stores instructions executable by the target vehicle computer 150 for performing various operations, including as disclosed herein.

Additionally, the target vehicle 145 may include sensors, actuators to actuate various vehicle components, an HMI, and a vehicle communications module. The sensors, actuators to actuate various vehicle components, the HMI, and the vehicle communications module typically have features in common with the sensors 115, actuators 120 to actuate various host vehicle components 125, the HMI 118, and the vehicle communications module 130, and therefore will not be described further to avoid redundancy.

The user device 155 can be a conventional computing device, i.e., including one or more processors and one or more memories, programmed to provide operations such as disclosed herein. The user device 155 can be any one of a variety of computers that can be used while carried by a person, e.g., a smartphone, a tablet, a personal digital assistant, a smart watch, a key fob, etc. The user device 155 may have an HMI that typically has features in common with the HMI 118, and therefore will not be described further to avoid redundancy. Further, the user device 155 can be accessed via the network 135, e.g., the Internet, a cellular network, and/or or some other wide area network.

The vehicle computer 110 can be programmed to select one or more attributes of the host vehicle 105 based on a first user input. In such an example, the vehicle computer 110 may actuate and/or instruct the HMI 118 to detect the first user input specifying the attribute(s). For example, the HMI 118 may be actuated by the vehicle computer 110 to display virtual buttons representing respective attributes on a touchscreen display to which the user can provide input to select the attribute(s). In other words, the HMI 118 may activate sensors 115 that can detect the user selecting the attribute(s). Upon detecting the first user input, the HMI 118 can provide the first user input to the vehicle computer 110, and the vehicle computer 110 can select the attribute(s) from the first user input.

As used herein, an "attribute" is a fact about a specific host vehicle 105. For example, an attribute can include a type of the host vehicle 105. A type of the vehicle, as used herein, is a classification or category of vehicle having common physical attributes, e.g., shape, size (i.e., dimensions), make, model, etc. As another example, an attribute may be an optional component, e.g., an after-market component, an accessory, etc., that has been included in or on the host vehicle 105 As used herein, an "optional component" is a component that can be added to the host vehicle 105, e.g., to adjust appearance and/or performance of the host vehicle 105, possibly replacing another vehicle component 125. As another example, an attribute can include operation data for the host vehicle 105. As used herein, "operation data" are data describing operation of the host vehicle 105. The operation data can include data describing, e.g., routes traveled by the host vehicle 105, how the host vehicle 105 operates along the routes (e.g., speed data, acceleration data, braking data, turning data, etc.), locations traveled to by the host vehicle 105, etc. As another example, an attribute can include occupant data for an occupant of the host vehicle 105. As used herein, "occupant data" is data specific to an occupant. The occupant data can, for example, identify a group, a club, an association, etc., to which the occupant belongs, e.g., based on a type of the host vehicle 105, an optional component, operation data, etc. As another example, the occupant data can identify a task, an event, a challenge, a route, etc., that the occupant has completed with the host vehicle 105.

Upon determining the attribute(s), the vehicle computer 110 can generate a first message 200. A first message includes a header 201 and a payload 202 (see FIG. 2A). The header 201 of the first message 200 may include a message type, a message size, etc. The payload 202 may include various data, i.e., message content. The payload 202 can include sub-payloads or payload segments 203-1, 203-2, 203-3 (collectively, referred to as payload segments 203). The respective payload segments 203 in FIG. 2A are illustrated as being of different lengths to reflect that different payload segments 203 may include various amounts of data, and therefore may be of different sizes, i.e., lengths. The payload 202 of the first message 200 includes, e.g., in a specified payload segment 203, data identifying the attribute(s).

The vehicle computer 110 broadcasts the first message 200, e.g., via the network 135, V2V communications, etc., to a plurality of remote computers 150, 155, i.e., a computer that is physically separate from the host vehicle 105. As one example, the vehicle computer 110 can broadcast the first message 200 upon generating the first message 200. As another example, the vehicle computer 110 can broadcast the first message 200 based on a second user input. In such an example, the vehicle computer 110 can actuate and/or instruct the HMI 118 to display virtual buttons representing various conditions, e.g., a time of day, a location, a power state of the host vehicle 105 (e.g., an ON state or an OFF state), etc., that the user can select to specify when to initiate broadcasting of the first message 200. The HMI 118 can detect the second user input, e.g., in the same manner as discussed above regarding the first user input. Upon detecting the second user input, the HMI 118 can provide the second user input to the vehicle computer 110, and the vehicle computer 110 can broadcast the first message 200 according to the condition(s) specified in the second user input. The vehicle computer 110 can draw power from a power supply (as discussed below) to broadcast the first message 200. Broadcasting the first message 200 according to the specified condition(s) can reduce a power draw by the vehicle computer 110 from a power supply as compared to continuously broadcasting the first message 200, which can conserve power stored in the power supply. A remote computer 150, 155 can provide a second message 205 in response to the first message 200, as discussed below. The remote computer 150, 155 can be the target vehicle computer 150, the user device 155, or any other computer that is physically separate from the host vehicle 105.

The vehicle computer 110 can, for example, broadcast the first message 200 according to one or more parameters. As used herein, a "parameter" is a value of a measurement of a physical characteristic; for a message or data transmission, a parameter is a measurement of a physical characteristic of a data transmission. Non-limiting examples of parameters include a range (i.e., a distance from the host vehicle 105 within which a data transmission can be detected), an orientation (i.e., an angle of a data transmission relative to a longitudinal axis of the host vehicle 105), a frequency (i.e., a number of instances that a data transmission is broadcast within a predetermined time period, e.g., 10 milliseconds, 1 second, etc.), etc.

The vehicle computer 110 can determine the parameters based on a third user input. For example, the vehicle computer 110 can actuate and/or instruct the HMI 118 to display virtual buttons representing various parameters that the user can select to specify the parameters for broadcasting the first message 200. The HMI 118 can detect the third user input, e.g., in the same manner as discussed above regarding the first user input. Upon detecting the third user input, the HMI 118 can provide the third user input to the vehicle computer 110, and the vehicle computer 110 can determine the parameters from the third user input.

The vehicle computer 110 can actuate one or more vehicle components 125 to output light and/or sound associated with an attribute based on the second message 205. For example, upon receiving the second message 205, the vehicle computer 110 can access a payload 207, e.g., a specified payload segment 208, of the second message 205 and retrieve a request to receive data about the attribute. The vehicle computer 110 can store, e.g., in a memory of the vehicle computer 110, a look-up table, or the like, that associates various attributes with corresponding vehicle components 125. The remote computer 150, 155 can provide a third message 210 in response to the actuation of the vehicle component(s) 125, as discussed below.

The vehicle computer 110 can, for example, access the look-up table and determine vehicle components 125 based on a requested attribute corresponding to, i.e., matching, the determined attribute. The vehicle computer 110 can then actuate vehicle components 125 to output the light and/or sound, e.g., an audio signal, a visual signal, or an audiovisual signal, to provide the requested data for the attribute. That is, the vehicle computer 110 can actuate the vehicle component(s) 125 to provide data about the attribute that can be detected by a remote sensor, e.g., a target vehicle 145 sensor, a user device 155 sensor, etc. As one example, the vehicle computer 110 can actuate a light component, e.g., interior lights, exterior lights, a projector, etc., of the host vehicle 105 to, e.g., illuminate the attribute, display an image of the attribute, display text of the requested data about the attribute, demonstrate the attribute (e.g., by changing a color, intensity, etc., of the light component), etc. As another example, the vehicle computer 110 can actuate a speaker and/or a horn to output an audio signal including the requested data about the attribute. As yet another example, the vehicle computer 110 can actuate a display to output a marker including a link to the requested data about the attribute. For example, the marker can be what is known as a Quick Response (QR) code; as is known, a QR code may be used to encode data that may be decoded upon acquiring an image of the QR code. As another example, the marker can be what is known as an Augmented Reality (AR) code; as is known an AR code may be used to encode data, e.g., AR content, that may be accessed and displayed upon being decoded from an image of the AR code.

The vehicle computer 110 can determine that the remote computer 150, 155 received the requested data based on a third message 210. For example, upon receiving the third message 210, the vehicle computer 110 can access a payload 212, e.g., a specified payload segment 213, of the second message 205 and retrieve a confirmation that the requested data was received. The vehicle computer 110 may be programmed to actuate a vehicle component 125, e.g., lighting component and/or a speaker, to output light and/or sound indicating receipt of the third message 210.

The vehicle computer 110 can, for example, update a count of third messages 210 received from various remote computers 150, 155. That is, upon receiving a third message 210 from a remote computer 150, 155, the vehicle computer 110 can increment the message count. Additionally, or alternatively, the vehicle computer 110 can provide the message count to the remote server computer 140. For example, the vehicle computer 110 can transmit the message count to the remote server computer 140, e.g., via the network 135.

The message count indicates a number of times that vehicle components 125 have been actuated to output a light and/or sound for an associated attribute. The message count can be stored, e.g., in a memory of the vehicle computer 110. The vehicle computer 110 can maintain message counts for respective attributes. That is, the vehicle computer 110 may store a plurality of message counts.

The vehicle computer 110 can be programmed actuate the vehicle component(s) 125 to stop outputting the light and/or sound. For example, the vehicle computer 110 can stop outputting the light and/or sound based on receiving the third message. As another example, the vehicle computer 110 can initiate a timer upon actuating the vehicle component(s) 125 to output the light and/or sound. The vehicle computer 110 can stop outputting the light and/or sound upon expiration of the timer. The timer includes a duration specified by a vehicle 105 and/or component 125 manufacturer, e.g., based on an amount of time that allows for detection of the light and/or sound output while minimizing a power draw from the vehicle components 125 to output the light and/or sound.

The vehicle component(s) 125 draw power from a power supply to output the light and/or sound associated with the identified attribute. The power supply provides electricity to the vehicle component(s) 125, and can include one or more batteries, e.g., 12-volt lithium-ion batteries, and one or more power networks to supply power from the batteries to the vehicle component(s) 125. Actuating the vehicle component(s) 125 to output the light and/or sound in response to the second message 205 and then actuating the vehicle component(s) 125 to stop outputting the light and/or sound in response to receiving the third message 210 or expiration of the timer, reduces a power draw from the vehicle component(s) 125 to output the light and/or sound. By limiting the output of the light and/or sound in the manner just described, the vehicle computer 110 can provide data of an identified host vehicle 105 attribute to a remote computer 150, 155 while conserving power in the power supply, e.g., to be able to operate the host vehicle 105.

The remote computer 150, 155 can receive the first message 200 from the vehicle computer 110. The remote computer 150, 155 can determine whether to ignore the first message 200 based on a fourth user input. For example, the remote computer 150, 155 can actuate and/or instruct an HMI to detect the fourth user input specifying various conditions that a user can select to specify when to ignore the first message 200, e.g., in the same manner as discussed above regarding the second user input. Upon detecting the fourth user input, the HMI can provide the fourth user input to the remote computer 150, 155, and the remote computer 150, 155 determine whether to ignore the first message 200 according to the condition(s) specified in the fourth user input.

Upon determining to not ignore the first message 200, the remote computer 150, 155 can identify the attribute(s) of the host vehicle 105. For example, upon receiving the first message 200, the remote computer 150, 155 can access a payload 202, e.g., a specified payload segment 203, of the first message 200 and retrieve the data identifying the attribute(s). Upon identifying the attribute(s), the remote computer 150, 155 can access a list, or the like, that identifies one or more requested attributes. The remote computer 150, 155 can store the list, e.g., in a memory of the remote computer 150, 155.

The remote computer 150, 155 can generate the list based on a fifth user input. For example, the remote computer 150, 155 can actuate and/or instruct an HMI to detect the fifth user input specifying the requested attribute(s), e.g., in the same manner as discussed above regarding the first input. Upon detecting the fifth user input, the HMI can provide the fifth user input to the remote computer 150, 155, and the remote computer 150, 155 can generate the list to include the attribute(s) specified by the fifth user input.

The remote computer 150, 155 can compare the identified attribute to the requested attributes. If the identified attribute does not match any requested attributes, i.e., is not included in the list, then the remote computer 150, 155 can ignore the first message 200. If the identified attribute matches a stored attribute, i.e., is included in the list, then the remote computer 150, 155 can generate the second message 205. Similar to the first message 200, the second message 205 includes a header 206 and a payload 207, including payload segments 208 (see FIG. 2B). The header 206 of the second message 205 may include a message type, a message size, etc. The payload 207, e.g., in a specified payload segment 208, includes a request for data about the attribute(s) included in the first message 200 that are included in the list. The remote computer 150, 155 can then provide the second message 205 to the vehicle computer 110, e.g., as discussed above regarding providing the first message 200.

Upon providing the second message 205, the remote computer 150, 155 can actuate one or more sensors, e.g., an image sensor and/or a microphone, to obtain sensor data including the host vehicle 105. In an example in which the remote computer 150, 155 is the target vehicle computer 150, the target vehicle computer 150 can identify the sensor(s) to actuate based on a location of the host vehicle 105 relative to a location of the target vehicle 145. The target vehicle computer 150 can, for example, determine the location of the host vehicle 105 based the first message 200. For example, the first message 200 may include location data, e.g., GPS coordinates, of the host vehicle 105. As another example, the target vehicle computer 150 can determine the location of the host vehicle 105 based on using known data processing techniques, e.g., determining angle of arrival (AoA) of the first message 200. The target vehicle computer 150 can then actuate the sensor(s) that face(s) the host vehicle 105, i.e., are orientated to obtain data in a direction from the target vehicle 145 to the host vehicle 105. In an example in which the remote computer 150, 155 is the user device 155, the user device 155 can actuate the sensor(s) based on detecting a user input via the HMI, e.g., in the same manner as discussed above regarding the first user input.

Upon obtaining the sensor data including the host vehicle 105, the remote computer 150, 155 can analyze the sensor data, e.g., according to known data processing techniques, to detect actuation of the vehicle component(s) 125 providing the requested data for the attribute(s). The remote computer 150, 155 can then output the requested data to a user, e.g., via the HMI. For example, the remote computer 150, 155 can actuate a display to display, e.g., an image of the attribute, a representation of data encoded in the marker, etc. Additionally, or alternatively, the remote computer 150, 155 can actuate a speaker to output a detected audio signal including the requested data.

Upon receiving the requested data, the second computer 150, 155 can generate the third message 210. Similar to the first message 200, the third message 210 includes a header 211 and a payload 212, including payload segments 213 (see FIG. 2C). The header 211 of the third message 210 may include a message type, a message size, etc. The payload 212, e.g., in a specified payload segment 213, includes the confirmation of receipt of the requested data. The second computer 150, 155 can then provide the third message 210 to the vehicle computer 110, e.g., as discussed above regarding providing the first message 200.

Figure 3:
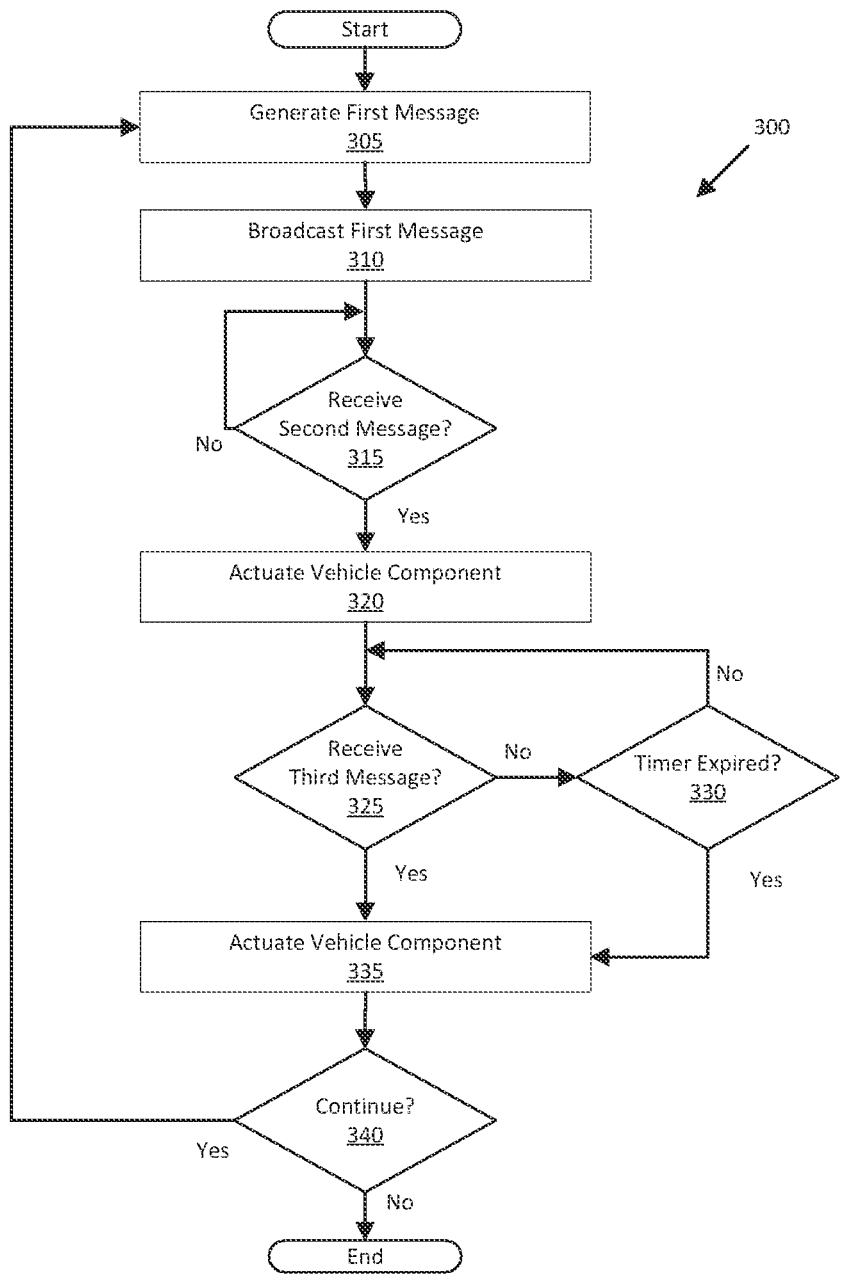
FIG. 3 is a flowchart of an example process for actuating one or more vehicle components in response to a request from a remote computer.

FIG. 3 is a flowchart of an example process 300 executed in a vehicle computer 110 according to program instructions stored in a memory thereof for actuating one or more vehicle components 125 in response to a request from a remote computer 150, 155. Process 300 includes multiple blocks that can be executed in the illustrated order. Process 300 could alternatively or additionally include fewer blocks or can include the blocks executed in different orders.

The process 300 begins in a block 305. In the block 305, the vehicle computer 110 generates a first message 200 identifying one or more attributes of a host vehicle 105, as discussed above. The vehicle computer 110 determines the attribute(s) based on a first user input, as discussed above. The process 300 continues in a block 310.

In the block 310, the vehicle computer 110 broadcasts the first message 200 to a plurality of remote computers 150, 155 around the host vehicle 105, e.g., based on one or more conditions specified via a second user input and/or one or more parameters specified via a third user input, as discussed above. The process 300 continues in a block 315.

In the block 315, the vehicle computer 110 determines whether a second message 205 is received. The second message 205 includes a request for data about an attribute identified in the first message 200, as discussed above. If the second message 205 is received, then the process 300 continues in a block 320. Otherwise, the process 300 remains in the block 315.

In the block 320, the vehicle computer 110 actuates one or more vehicle components 125 to output light and/or sound associated with the attribute identified in the second message 205, as discussed above. Additionally, the vehicle computer 110 can initiate a timer, as discussed above. The process 300 continues in a block 325.

In the block 325, the vehicle computer 110 determines whether a third message 210 is received. The third message 210 includes a confirmation of receipt of the requested data, as discussed above. If the third message 210 is received, then the vehicle computer 110 can update a count of received third messages 210, as discussed above, and the process 300 continues in a block 335. Otherwise, the process 300 continues in a block 330.

In the block 330, the vehicle computer 110 can determines whether the timer is expired. If the timer is expired, then the process 300 continues in the block 335. Otherwise, the process 300 returns to the block 325.

In the block 335, the vehicle computer 110 actuates the vehicle component(s) 125 to stop outputting the light and/or sound associated with the attribute. The process 300 continues in a block 340.

In the block 340, the vehicle computer 110 determines whether to continue the process 300. For example, the vehicle computer 110 can determine to continue upon determining that the host vehicle 105 is powered on. In another example, the vehicle computer 110 can determine not to continue when the host vehicle 105 is powered off. If the vehicle computer 110 determines to continue, the process 300 returns to the block 305. Otherwise, the process 300 ends.

Figure 4:
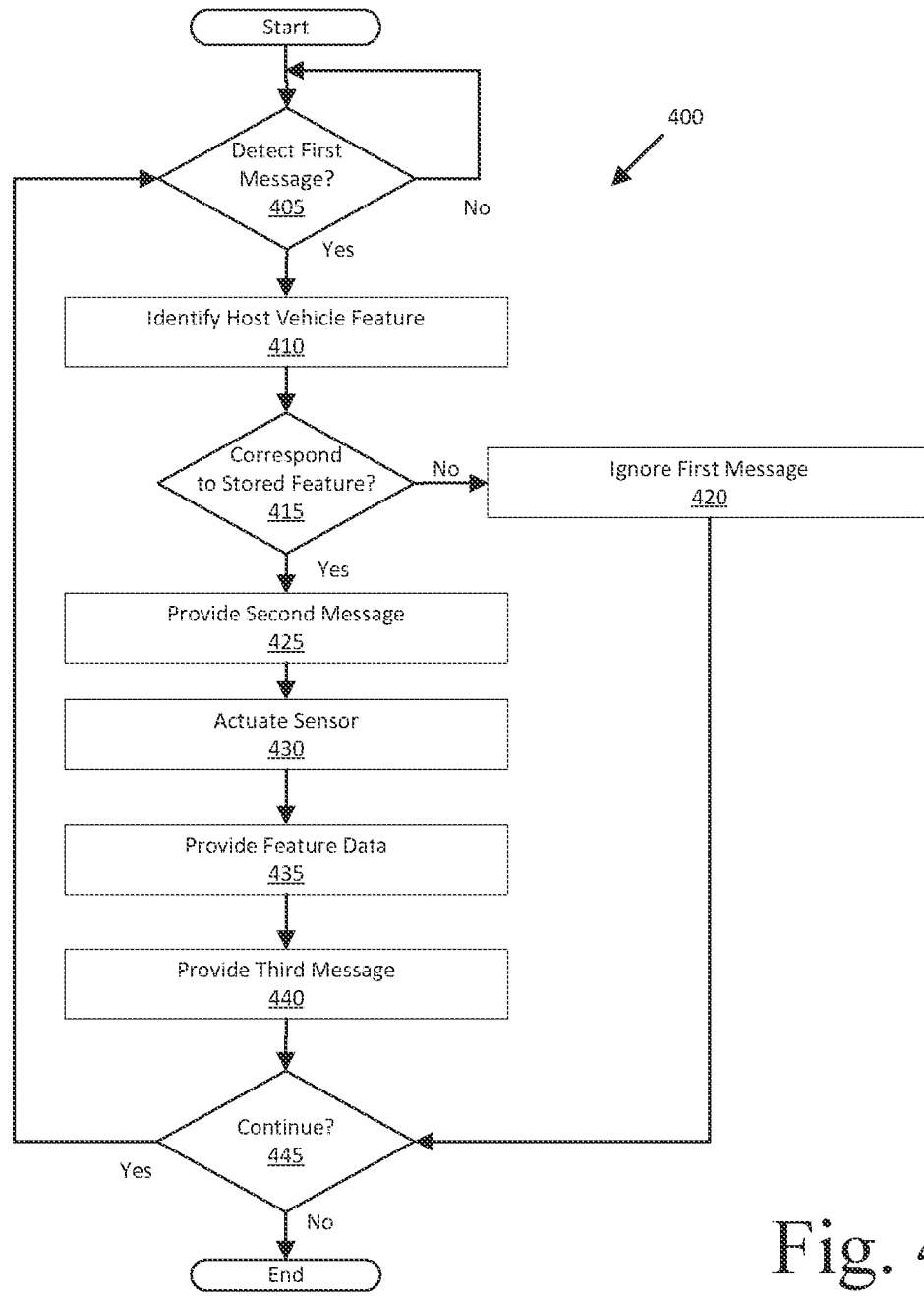
FIG. 4 is a flowchart of an example process for obtaining data about an attribute of the host vehicle.

FIG. 4 is a flowchart of an example process 400 executed in a remote computer 150, 155 separate from the host vehicle 105 according to program instructions stored in a memory thereof for obtaining data about an attribute of the host vehicle 105. Process 400 includes multiple blocks that can be executed in the illustrated order. Process 400 could alternatively or additionally include fewer blocks or can include the blocks executed in different orders.

The process 400 begins in a block 405. In the block 405, the remote computer 150, 155 determines whether the first message 200 is received. If the first message 200 is received, then the process 400 continues in a block 410. Otherwise, the process 400 remains in the block 405.

In the block 410, the remote computer 150, 155 identifies one or more attributes of the host vehicle 105 based on the first message 200, as discussed above. The process 400 continues in a block 415.

In the block 415, the remote computer 150, 155 determines whether the identified attribute(s) corresponds to, i.e., matches, requested attribute(s), as discussed above. The remote computer 150, 155 can determine the requested attributes based on a fifth user input, as discussed above. The remote computer 150, 155 can then compare the requested attributes to the identified attribute(s). If the identified attribute(s) matches a requested attribute, then the process 400 continues in a block 425. If the identified attribute(s) do(es) not match any requested attribute, then the process 400 continues in a block 420.

In the block 420, the remote computer 150, 155 ignores the first message 200. The process 400 continues in a block 445.

In the block 425, the remote computer 150, 155 provides a second message 205 to the vehicle computer 110 requesting data about the identified attribute(s) that match the requested attribute(s), as discussed above. The process 400 continues in a block 430.

In the block 430, the remote computer 150, 155 actuates a sensor to obtain data including the host vehicle 105, and specifically, actuation of the vehicle component(s) 125, as discussed above. The remote computer 150, 155 can then analyze the sensor data to determine the requested data for the attribute(s) based on the light and/or sound output, as discussed above. The process 400 continues in a block 435.

In the block 435, the remote computer 150, 155 provides the determined data to a user, e.g., via an HMI, as discussed above. The process 400 continues in a block 440.

In the block 440, the remote computer 150, 155 provides a third message 210 to the vehicle computer 110 confirming receipt of the requested data, as discussed above. The process 400 continues in a block 445.

In the block 445, the remote computer 150, 155 determines whether to continue the process 400. For example, the remote computer 150, 155 can determine to continue upon determining that the target vehicle 145 or the user device 155 is powered on. In another example, the remote computer 150, 155 can determine not to continue when the target vehicle 145 or the user device 155 is powered off. If the remote computer 150, 155 determines to continue, the process 400 returns to the block 405. Otherwise, the process 400 ends.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
broadcasting a first message to a plurality of remote computers identifying an attribute of a host vehicle;
receiving, from one of the remote computers, a second message including a request to receive data about the identified attribute in response to broadcasting the first message;
upon receiving the second message, actuating a host vehicle component to output at least one of light or sound associated with the identified attribute;
actuating a target vehicle component based on detecting actuation of the host vehicle component, wherein the actuation of the host vehicle component provides data about the identified attribute for detection by a target vehicle sensor; and
actuating the target vehicle sensor to obtain the sensor data including the host vehicle upon providing the second message.

2. The method of claim 1, further comprising determining the attribute of the host vehicle to broadcast based on a user input.

3. The method of claim 1, further comprising determining broadcast parameters based on a user input.

4. The method of claim 1, further comprising initiating broadcasting of the first message based on a user input.

5. The method of claim 1, wherein the attribute includes at least one of a vehicle type, operation data, or occupant data.

6. The method of claim 1, wherein the host vehicle component is at least one of a lighting component, a speaker or a display.

7. A system, comprising:
a host vehicle computer including a processor and a memory, the memory storing instructions executable by the processor to:
broadcast a first message to a plurality of remote computers identifying an attribute of a host vehicle;
receive, from one of the remote computers, a second message including a request to receive data about the identified attribute in response to broadcasting the first message; and
upon receiving the second message, actuate a host vehicle component to output at least one of light or sound associated with the identified attribute; and
the one remote computer, the one remote computer being included in a target vehicle, wherein the one remote computer includes a second processor and a second memory storing instructions executable by the second processor to:
actuate a target vehicle component based on detecting actuation of the host vehicle component, wherein the actuation of the host vehicle component provides data about the identified attribute for detection by a target vehicle sensor; and
actuate the target vehicle sensor to obtain the sensor data including the host vehicle upon providing the second message.

8. The system of claim 7, wherein the instructions further include instructions to, upon actuating the host vehicle component, receive, from the one remote computer, a third message confirming receipt of the requested data.

9. The system of claim 7, wherein the target vehicle component is at least one of a speaker or a display.

10. The system of claim 7, wherein the host vehicle component is at least one of a lighting component, a speaker or a display.

11. The system of claim 7, wherein the instructions further include instructions to select the attribute of the host vehicle based on a user input.

12. The system of claim 7, wherein the instructions further include instructions to determine broadcast parameters based on a user input.

13. The system of claim 7, wherein the instructions further include instructions to initiate broadcasting of the first message based on a user input.

14. The system of claim 7, wherein the one remote computer is further programmed to identify the attribute of the host vehicle based on receiving the first message.

15. The system of claim 14, wherein the one remote computer is further programmed to provide the second message based on determining that the identified attribute corresponds to a requested attribute.

16. The system of claim 15, wherein the one remote computer is further programmed to ignore the first message based on determining that the identified attribute does not correspond to the requested attribute.

17. The system of claim 15, wherein the one remote computer is further programmed to determine the requested attribute based on a user input.

18. The system of claim 7, wherein the attribute includes at least one of a vehicle type, operation data, or occupant data.

* * * * *